(12) United States Patent
Nomura et al.

(10) Patent No.: US 8,510,014 B2
(45) Date of Patent: Aug. 13, 2013

(54) GAS TURBINE CONTROL METHOD AND DEVICE

(75) Inventors: Masumi Nomura, Yokohama (JP); Hideki Haruta, Takasago (JP); Shigeru Ano, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 66 days.

(21) Appl. No.: 12/933,959

(22) PCT Filed: Apr. 15, 2009

(86) PCT No.: PCT/JP2009/057944
§ 371 (c)(1),
(2), (4) Date: Oct. 21, 2010

(87) PCT Pub. No.: WO2010/061647
PCT Pub. Date: Jun. 3, 2010

(65) Prior Publication Data
US 2011/0191004 A1    Aug. 4, 2011

(30) Foreign Application Priority Data
Nov. 27, 2008 (JP) ................. 2008-301894

(51) Int. Cl.
G06F 19/00 (2011.01)
G06G 7/70 (2006.01)
G05D 1/00 (2006.01)
F02C 9/26 (2006.01)

(52) U.S. Cl.
USPC ........... 701/100; 701/102; 701/103; 701/104; 60/30

(58) Field of Classification Search
USPC ................. 701/100, 103, 112, 109, 114, 104, 701/108; 477/30, 101; 105/61.5; 707/609; 60/772, 276, 783, 773, 285, 39.5, 274; 435/437; 431/12, 14; 123/697, 435, 691, 123/693; 73/118.1; 702/56, 33
See application file for complete search history.

(56) References Cited

U.S. PATENT DOCUMENTS 4,345,561 A * 8/1982 Kondo et al. ................. 123/674
6,330,515 B1 * 12/2001 Wettstein ........................ 702/56

(Continued)

FOREIGN PATENT DOCUMENTS

CN  101126353 A  2/2008
CN  101203668 A  6/2008

(Continued)

OTHER PUBLICATIONS

International Search Report of PCT/JP2009/057944, mailing date May 26, 2009.

(Continued)

*Primary Examiner* — Fadey Jabr
*Assistant Examiner* — Kevin P Mahne
(74) *Attorney, Agent, or Firm* — Westerman, Hattori, Daniels & Adrian, LLP (57) ABSTRACT

A gas turbine control method and device to restrain combustion vibration more precisely by alleviating the relationship between the composition or heat quantity of the fuel and the combustion vibration characteristic and by grasping the combustion vibration characteristic more accurately. The combustion vibration generated by a burner of the gas turbine and the composition or heat quantity and other plant status amounts of fuel supplied to the burner are detected. The combustion vibration characteristic is grasped based on the detected values. When the combustion flow rate or air flow rate supplied to the burner is increased/decreased to obtain operation condition under which no combustion vibration occurs, the detected values of the combustion vibration as well as the composition or heat quantity and other plant status amounts of the fuel are divided and stored in multiple databases corresponding to the value of the composition or heat quantity of the fuel.

2 Claims, 3 Drawing Sheets

(56) References Cited

U.S. PATENT DOCUMENTS

| | | | |
|---|---|---|---|
| 7,096,722 B2 * | 8/2006 | Benson et al. | 73/114.08 |
| 7,188,019 B2 | 3/2007 | Nomura et al. | |
| 2005/0107942 A1 | 5/2005 | Nomura et al. | |
| 2009/0125207 A1 * | 5/2009 | Nomura et al. | 701/100 |

FOREIGN PATENT DOCUMENTS

| | | |
|---|---|---|
| EP | 1 895 126 A1 | 3/2008 |
| JP | 5-187271 A | 7/1993 |
| JP | 2003-314301 A | 11/2003 |
| JP | 2005-155590 A | 6/2005 |
| JP | 2006-183652 A | 7/2006 |
| JP | 3930371 B2 | 6/2007 |

OTHER PUBLICATIONS

European Search Report dated Mar. 27, 2012, issued in corresponding European Patent Application No. 09828897.0, (6 pages).

International Preliminary Report on Patentability (Form PCT/IB/373) of International Application No. PCT/JP2009/057944 mailed Jul. 5, 2011, with Form PCT/ISA/237, with translation.

Office Action dated Oct. 31, 2012, issued in corresponding Chinese Patent Application No. 200980111368.2, and English Translation thereof (14 pages).

\* cited by examiner

GAS TURBINE CONTROL METHOD AND DEVICE

BACKGROUND OF THE INVENTION

1. Field of the Invention

The present invention relates to a gas turbine control method and the device thereof; thereby, the fuel flow rate or air flow rate to be supplied to combustors is increased and decreased in order to obtain operation condition under which no combustion vibration occurs.

2. Background of the Invention

In the conventional gas turbine plants, with respect to the parameters such as the power output of the generator and the ambient temperature, the flow rates of the fuel and the air supplied to the combustors are predetermined; the air flow rate or the air flow rate is fine adjusted in the test runs of the gas turbine. After being commissioned, the gas turbine is operated based on the fine adjusted fuel flow rate and airflow rate as established standard setting-values.

According to the control method as described above, however, there remains a possibility that the fuel contents, the fuel flow rate and the airflow rate in the practical operation deviate from those in the commissioning condition, as the components and calorific value of the fuel supplied to the gas turbine may change and the secular change such as the deterioration of the compressor performance or the filter clogging may happen.

Further, because of the deviation described above, there may be caused apprehension that the combustion stability may be hindered and combustion vibrations consequently occur, the operation of the gas turbine plant being seriously hampered. Hence, it is strongly requested to evade the occurrence of the combustion vibrations, in view of protection of the facilities in the plant as well as enhancement of the availability (the rate of operation) of the gas turbine.

The patent reference 1 (JP1993-187271) discloses a control method for controlling the gas turbine plant so as to maintain the stable combustion; thereby, the airflow rate or the fuel flow rate as to the gas turbine combustor is controlled in response to the change in the calorific value of the fuel based on the contents (components) in the fuel.

In the control method disclosed in the patent reference 1, the bias control regarding the airflow rate or the fuel flow rate is made use of; namely, the bias coefficient is established in response to the change in the calorific value of the fuel, based on the contents in the fuel; and, the change in the calorific value is multiplied by the bias coefficient to obtain a correction value that is added to or subtracted from the standard setting value regarding the fuel flow rate or the airflow rate; thus, the fuel flow rate or the air flow rate is adjusted.

However, according to the above-described method, the bias coefficient corresponding to the change in the fuel calorific value is uniquely established; thus, the degree of freedom as to the control adjustment is limited; and, it is difficult to adjust the airflow rate or the fuel flow rate so that each of the flow rates converges to an optimally controlled value.

To this end, the inventors of the present invention have proposed a gas turbine control device in the patent reference 2 (JP2006-183652), so as to improve the above-described problem. Firstly, the proposed control device is now explained with reference to FIGS. 4 and 5; the entire contents of the patent reference 2 (JP2006-183652) are hereby incorporated by reference.

Figure 4:
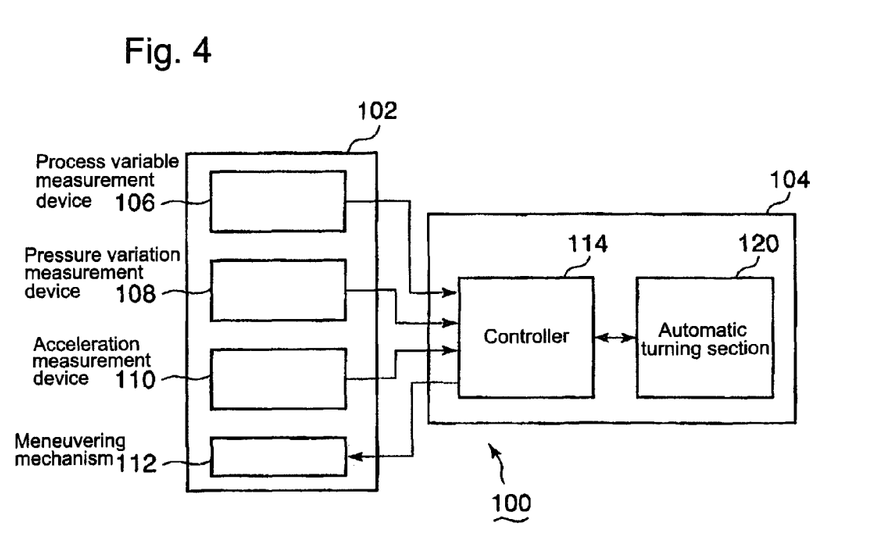
FIG. 4 shows a block diagram of the whole gas turbine plant.

In FIG. 4, the gas turbine plant 100 comprises the gas turbine 102 that is rotationally driven by the thermal energy produced by the combustion of the supplied fuel and the gas turbine control unit 104 that controls the gas turbine 102.

The gas turbine 102 is provided with: the process variable measurement device 106 that measures each process variable (the plant state variable) that indicates the operation condition or the operation state regarding the gas turbine 102; the pressure variation measurement device 108 and the acceleration measurement device 110 that are fitted to the combustors (described later in detail) 32 (cf. FIG. 1) installed in the gas turbine 102; the maneuvering mechanism 112 that manipulates each actuating part of the gas turbine 102. Incidentally, the process variables include, for instance, the flow rate as to the fuel and the air that are supplied to each combustor 32.

The gas turbine control unit 104 is provided with: the controller 114 that generates the control signals to be transmitted to the maneuvering mechanism 112 on the basis of the signals from the process variable measurement device 106, the pressure variation measurement device 108 and the acceleration measurement device 110; the automatic tuning section 120 that adjust the control signals generated by the controller 114.

Figure 5:
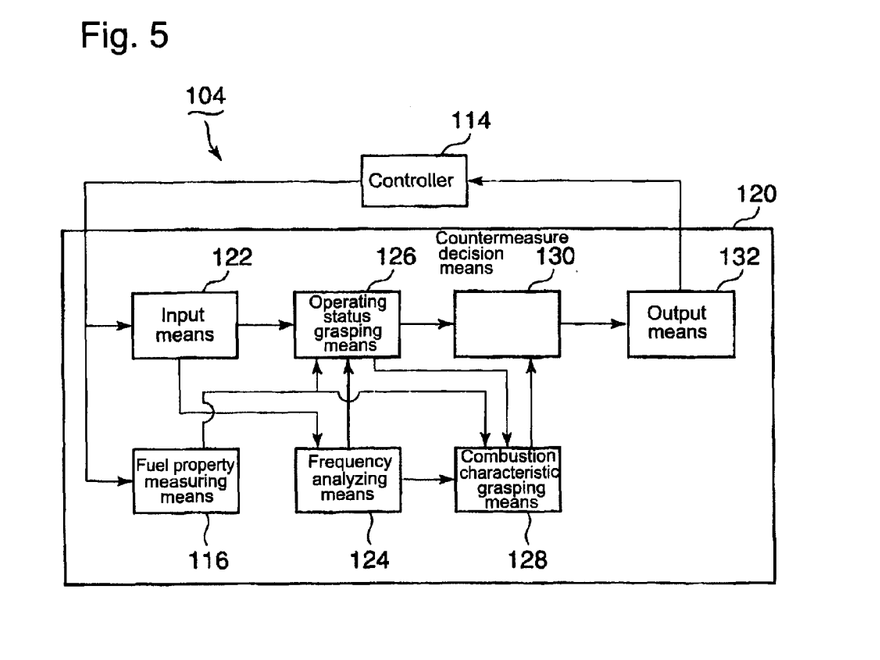
FIG. 5 shows a block diagram of the conventional gas turbine control unit.

In the next place, the configuration of the automatic tuning section 120 is now explained with reference to FIG. 5. As shown in FIG. 5, the automatic tuning section 120 comprises:

the input means 122 in which the process variable (e.g. the fuel flow rate or the airflow rate) as a measured result (value) at each part of the gas turbine 102 is inputted;

the frequency analyzing means 124 that analyzes the pressure fluctuations or the accelerations regarding each combustor 32 per each predetermined frequency bandwidth;

the operation status grasping means 126 that grasps the (operation) state of the gas turbine 102;

the combustion characteristic grasping means 128 that establishes mathematical formulae (models) which model combustion characteristics, on the basis of the process variables regarding the gas turbine 102 as well as on the basis of the combustion vibration analysis results per each predetermined frequency bandwidth, the analysis results being stored in the database (data table) provided in the combustion characteristic grasping means 126, for confirming the operation state of the gas turbine;

the countermeasure decision means 130 that establishes the adjustment (increment) regarding each (actuating) part of the gas turbine, on the basis of the established mathematical formulae (models);

the output means 132 that outputs the adjustments established in the countermeasure decision means 130 into the controller 114.

Further, the gas turbine 102 is provided with the fuel property measuring means 116 as a component of the process variable measurement device 106, the fuel property measuring means 116 being used for measuring the fuel contents of the fuel gas supplied to the combustors. For instance, the fuel property measuring means 116 is configured as a gas analyzer that measures the fuel contents of the fuel gas. In the fuel property measuring means 116, the volume ratios regarding a plurality of fuel gas components in the fuel are measured; from the obtained volume ratios, the fuel content analysis is performed or the calorific value of the fuel gas is calculated. The result as to the fuel content analysis or the fuel calorific value is outputted as the measuring result.

The signal corresponding to the measuring result outputted by the fuel property measuring means 116 is inputted into the operation status grasping means 126; the signals corresponding to the measuring results obtained by the process variable measurement device 106 other than obtained by the fuel property measuring means 116 are inputted into the input means 122. Further, the signals corresponding to the measuring results outputted by the pressure variation measurement device 108 and the acceleration measurement device 110 are also inputted into the input means 122.

The pressure variation measurement device 108 measures the pressure fluctuations in the multiple combustors 32, while the acceleration measurement device 110 measures the vibrations of the combustors as accelerations; thus, the combustion vibration of each combustor 32 is measured. The data regarding the pressure fluctuations (the pressure vibrations) as well as the accelerations (the acceleration vibrations) are transmitted to the frequency analyzing means 124 via the input means 122; in the frequency analyzing means 124, frequency analyses are performed. In performing the frequency analyses, the whole frequency range to be treated is divided into n frequency bandwidths in advance; in each frequency bandwidth, the strength (the level) of the vibration is analyzed; thus, the maximum value of the vibration strength regarding each bandwidth is sought, and the maximum value is inputted into the operation status grasping means 126.

The operation status grasping means 126 judges whether or not the combustion vibration level of each combustor has to be immediately restrained by performing control adjustments, on the basis of the data regarding the process variables transmitted from the input means 122, the information regarding the components or the calorific value of the fuel the information which is measured and obtained by the fuel property measuring means 116, and the data regarding the maximum vibration strength in relation to the combustion vibrations the data which is obtained by the frequency analyzing means 124. Further, when the operation status grasping means 126 recognizes an abnormal condition in a certain bandwidth, the change of the plant operation state such as the plant load demand or the suction air temperature, then the data regarding each process variable including the information regarding the maximum value of the vibration strength as well as the information regarding the components or the calorific value of the fuel are accumulated as logged data.

The logged data are transmitted to the combustion characteristic grasping means 128; in the grasping means 128, based on the logged data, the mathematical model for modeling the combustion characteristics is formulated. In other words, in the combustion characteristic grasping means 128, the maximum value regarding the strength of the pressure vibrations in each frequency bandwidth is expressed with respect to the process variables such as the components or the calorific value of the fuel, or the air flow rate, the process variables being treated as independent variables; for instance, by use of linear multiple regression approach, the maximum values are expressed (modeled) in a set of linear functions of the independent variables. In addition, in a case of the modeling by the linear multiple regression approach, the coefficients regarding the independent variables in the linear expressions are determined (solved), for example, by use of the method of least square.

Incidentally, the measurement information data in the a fuel property measuring means 116 as well as the information data accumulated in the operation status grasping means 126 is transmitted into the combustion characteristic grasping means 128.

According to the mathematical model, the countermeasure decision means 130 identifies at least one process variable that tends to cause combustion vibrations in each frequency bandwidth; further, the countermeasure decision means 130 establishes the relation between each process variable (chiefly the fuel flow rate or the airflow rate) and the degree (level) of combustion vibrations; by use of the established relations (e.g. equations) regarding multiple process variables, a feasible domain regarding the multiple process variables where combustion vibrations are prone (or less prone) to occur is demarcated, for example, by the aid of the approach as is used in the field of linear programming. Further, on the basis of the information as to the demarcated domain where combustion vibrations are prone (or less prone) to occur, the correction values are established in the countermeasure decision means 130; hereby, the correction values are in relation to each process variable (e.g. the fuel flow rate or the airflow rate) and the corresponding actuating variable for manipulating and controlling the gas turbine 102. The data regarding the established correction values are inputted into the controller 114 from the output means 132.

As described above, the gas turbine operation conditions under which the combustion vibrations are difficult to occur are determined; operating the gas turbine according to the operating conditions prevents the combustion vibrations from occurring.

However, even though the above-described control method disclosed in the patent reference 2 is performed, it is not so easy to control the gas turbine with a high degree of accuracy, as the operators expect it is easy to control the gas turbine; the reason is that the relationship between the conditions causing combustion vibrations and the fuel properties (such as the components or the calorific value of the fuel) can be regarded as a strong nonlinear relation, and the combustion vibrations severely fluctuate. Hence, according to the conventional way as described above, it is difficult to completely restrain the combustion vibrations.

DISCLOSURE OF THE INVENTION

In view of the difficulties of the conventional technologies as described above, the present invention aims at accurately restraining the combustion vibrations in the gas turbine plant, by easing the nonlinear property that appears on the grasped approximation relationship between the combustion vibration characteristics and the components or the calorific value of the fuel so as to correctly grasp the combustion vibration characteristics.

In order to reach the goal of the above-described aim, the present invention discloses a gas turbine control method for controlling a gas turbine plant and the gas turbine thereof, the method comprising the steps of:

detecting combustion vibrations occurring in each combustor of the gas turbine, components or calorific value of fuel supplied to the combustor, and operation state variables of other plant;

grasping combustion vibration characteristics on the basis of the detected values obtained in the detecting step; and increasing and decreasing flow rate of fuel or air supplied to the combustor so as to maintain an operation condition under which the combustion vibrations are unlikely to occur, based on the grasped combustion vibration characteristics;

wherein, data of the detected values regarding the combustion vibrations, the components or the calorific value of the fuel and the operation state variables of the other plant are divided and stored into a plurality of databases in response to a level of the detected values, thereby enhancing the accuracy of approximation treatments that are performed per data stored in each database; and data of a boundary region regarding the components or the calorific value of the fuel is stored into two databases so that the data stored in the two databases have a common interval which is an area having the data overlapped between the two databases, thereby decreasing discontinuity in mathematically modeling the combustion vibration characteristics in a process of the approximation treatments.

According to the present invention, the data of the detected values regarding the combustion vibrations, the components or the calorific value of the fuel and the operation state variables of the other plant are divided and stored into a plurality of databases in response to a level of the detected values, so that, when data processing to be performed per each database is performed, the non-linearity in modeling the relationship between the combustion vibrations and the components or the is decreased, thereby enhancing the accuracy of the approximation treatments that are performed per the data stored in each database.

Further, according to the present invention as disclosed above, by storing the data of a boundary region regarding the components or the calorific value of the fuel into two databases, the discontinuity in mathematically modeling the combustion vibration characteristics in a process of the approximation treatments can be reduced.

In this way, the combustion vibration characteristics can be correctly grasped; thus, the combustion vibrations can be accurately restrained.

In addition, it is hereby noted that the mathematical model used as numerical calculation approximations may be of a quadratic form, a high degree form (higher than 2), or a nonlinear expression as is used in the field of the neural network, other than the linear expression that is simple in applying the method of least squares.

In addition, in the above method invention, the contents or the calorific values of the fuel may be measured by a fuel analyzer; or, by use of the gas analyzer, the volume ratios regarding a plurality of fuel gas components in the fuel may be measured so as to perform the fuel content analysis or the fuel calorific value. Further, the fuel contents or the fuel calorific value may be arithmetically calculated by measuring the generator output, the generator efficiency or the fuel flow rate instead of directly measuring the fuel contents or the fuel calorific value.

A preferable embodiment as to the above method invention is the gas turbine control method, wherein the common interval between the two database is divided by a threshold value into a higher range and a lower range, so that, when the data in the database having a higher level position than a level position of the other database is to be processed, the data in the lower range of the database having the higher level position is selected, and when the data in the database having a lower level position than a level position of the other database is to be processed, the data in the higher range of the database having the lower level position is selected;

thereby grasping the combustion vibration characteristics from the data stored in the database to be processed and the selected data.

As described above, the discontinuity regarding the combustion vibration characteristics can be eased, the discontinuity appearing between the (adjacent) databases, namely, between the data of the common interval in the first database and the data of the common interval in the second database.

The present invention discloses a gas turbine control device for controlling a gas turbine control device for controlling a gas turbine plant and the gas turbine thereof, thereby detecting combustion vibrations occurring in each combustor of the gas turbine, components or calorific value of fuel supplied to the combustor, and operation state variables of other plant;

grasping combustion vibration characteristics on the basis of the detected values obtained in the detecting step; and increasing and decreasing flow rate of fuel or air supplied to the combustor so as to maintain an operation condition under which the combustion vibrations are unlikely to occur, based on the grasped combustion vibration characteristics;

wherein, the gas turbine control device is provided with a plurality of databases each of which is stored the detected values regarding the combustion vibrations, the components or the calorific value of the fuel and the other plant operation state variables, the whole data of the detected values being divided in each database in response to a level of the detected values regarding the components or the calorific value of the fuel, and data of a boundary region regarding the components or the calorific value of the fuel is stored into two databases so that the data stored in the two databases have a common interval which is an area having the data overlapped between the two databases.

With the configuration as described above, the non-linear relationship between the combustion vibrations and the components or the calorific value of the fuel can be eased, the relationship appearing in the approximation treatment processes regarding the combustion vibration characteristics analysis by use of the data per each database. Thus, the degree of the accuracy in approximating the combustion vibration characteristics is enhanced; further, as described above, two databases form a common interval that is an area having overlapped data. Thus, the common interval of the two databases includes common data points regarding the component or the calorific value of the fuel. Accordingly, the discontinuity in mathematically modeling the vibration characteristics in the process of the approximation treatments can be reduced.

In the next place, a preferable embodiment of the above-described device invention is the gas turbine control device wherein provided is a threshold value for dividing the common interval between the two database into a higher range and a lower range; and the device is constructed so that, when the data in the database having a higher level position than a level position of the other database is to be processed, the data in the lower range of the database having the higher level position is selected, and when the data in the database having a lower level position than a level position of the other database is to be processed, the data in the higher range of the database having the lower level position is selected;

thereby grasping the combustion vibration characteristics from the data stored in the database to be processed and the selected data.

As described above, the discontinuity regarding the combustion vibration characteristics can be eased, the discontinuity appearing between the (adjacent) databases, namely, between the data of the common interval in the two databases.

According to the above-described method invention, a gas turbine control method for controlling a gas turbine plant and the gas turbine thereof is provided, the method comprising the steps of:

detecting combustion vibrations occurring in each combustor of the gas turbine, components or calorific value of fuel supplied to the combustor, and operation state variables of other plant;

grasping combustion vibration characteristics on the basis of the detected values obtained in the detecting step; and increasing and decreasing flow rate of fuel or air supplied to the combustor so as to maintain an operation condition under which the combustion vibrations are unlikely to occur, based on the grasped combustion vibration characteristics;

wherein, data of the detected values regarding the combustion vibrations, the components or the calorific value of the fuel and the operation state variables of the other plant are divided and stored into a plurality of databases in response to a level of the detected values, thereby enhancing the accuracy of approximation treatments that are performed per data stored in each database; and data of a boundary region regarding the components or the calorific value of the fuel is stored into two databases so that the data stored in the two databases have a common interval which is an area having the data overlapped between the two databases, thereby decreasing discontinuity in mathematically modeling the combustion vibration characteristics in a process of the approximation treatments.

Therefore, the degree of the accuracy in approximating the combustion vibration characteristics is enhanced; further, as described above, the two databases form a common interval that is an area having a common data. Thus, the common interval in the two databases includes common data points regarding the component or the calorific value of the fuel. Accordingly, the discontinuity in mathematically modeling the vibration characteristics in the process of the approximation treatments can be reduced.

In this way, since the combustion vibration characteristics can be correctly grasped, the combustion vibrations can be accurately restrained (controlled).

According to the above-described method invention, a gas turbine control device for controlling a gas turbine plant and the gas turbine thereof is provided; thereby detecting combustion vibrations occurring in each combustor of the gas turbine, components or calorific value of fuel supplied to the combustor, and operation state variables of other plant;

grasping combustion vibration characteristics on the basis of the detected values obtained in the detecting step; and increasing and decreasing flow rate of fuel or air supplied to the combustor so as to maintain an operation condition under which the combustion vibrations are unlikely to occur, based on the grasped combustion vibration characteristics;

wherein, the gas turbine control device is provided with a plurality of databases each of which is stored the detected values regarding the combustion vibrations, the components or the calorific value of the fuel and the other plant operation state variables, the whole data of the detected values being divided in each database in response to a level of the detected values regarding the components or the calorific value of the fuel, and data of a boundary region regarding the components or the calorific value of the fuel is stored into two databases so that the data stored in the two databases have a common interval which is an area having the data overlapped between the two databases.

Therefore, the present device invention can provide the same effects as the above-described method invention.

DETAILED DESCRIPTION OF THE PREFERRED EMBODIMENTS

Hereafter, the present invention will be described in detail with reference to the embodiments shown in the figures.

However, the dimensions, materials, shape, the relative placement and so on of a component described in these embodiments shall not be construed as limiting the scope of the invention thereto, unless especially specific mention is made.

Figure 1:
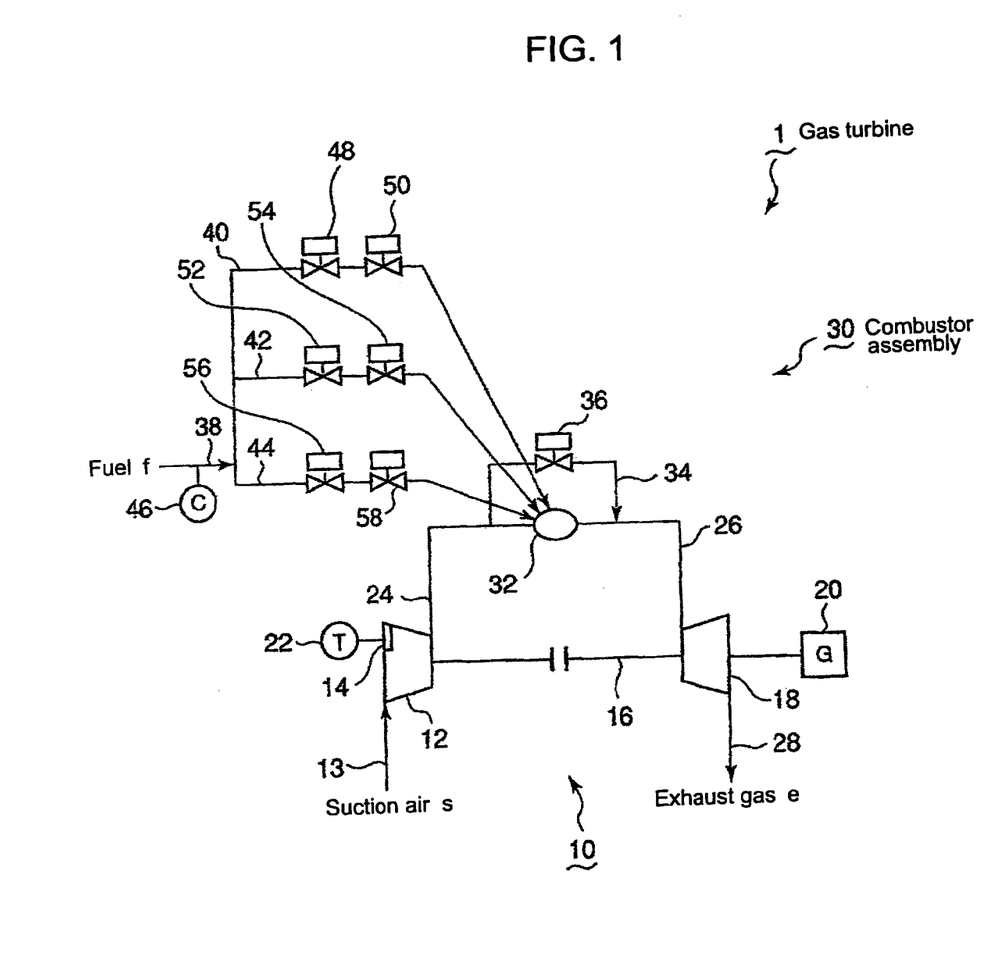
FIG. 1 shows the configuration of the gas turbine plant according to a first embodiment of the present invention.

The device as a first embodiment according to the present invention is now explained with reference to FIGS. 1 to 3. FIG. 1 shows the configuration of the gas turbine plant according to a first embodiment of the present invention. In FIG. 1, a gas turbine 1 is provided with a gas-turbine body 10 and a combustor assembly 30. The gas-turbine body 10 is provided with a compressor 12 having a plurality of inlet guide vanes 14, a rotating shaft 16 and a turbine 18; a generator 20 is connected to the turbine 18. A suction air temperature sensor 22 for detecting the temperature of suction air s passing through the space among the inlet guide vanes 14 is provided; the detected value detected by the suction air temperature sensor 22 is inputted into a controller 62 of a gas turbine control unit 60 shown in FIG. 2; the gas turbine control unit 60 corresponds to a gas turbine control unit 104 of FIG. 4 and the controller 62 corresponds to a controller 114 of FIG. 4.

The turbine 18 is connected to a combustion gas guide pipe 26 and an exhaust gas pipe 28 that discharges combustion exhaust gas e outward; further, the turbine 18 is connected to the compressor 12 and the generator 20 via the rotating shaft 16. The produced combustion gas is supplied to the turbine 18 through the combustion gas guide pipe 26; the exhaust gas rotates the turbine 18; the rotation movement is transmitted to the generator 20 and the compressor 12. The combustion gas that is used for the power generation is discharged outward through the exhaust gas pipe 28, as the exhaust gas e.

The compressor 12 is connected to an ambient air guide pipe 13 and a compressed air guide duct 24; the compressor 12 is coupled with the turbine 18 and the generator 20 via the rotating shaft 16; the rotation movement of the turbine 18 is transmitted to the compressor 12 so that the compressor 12 rotates. By the rotation movement of the compressor 12, the ambient air is inhaled through the ambient air guide pipe 13; the suction air s thus inhaled is compressed and delivered to the combustors 32.

The inlet guide vanes 14 of the compressor 12 are provided at the passage of the suction air s; the flow rate of the suction air s can be adjusted by adjusting the attack angles of the inlet guide vanes 14 even when the rotation speed of the compressor is constant. The gas turbine control unit 60 controls the attack angle.

In the next place, the combustor assembly 30 is explained. The combustor 32 is connected to the compressed air guide duct 24 and the combustion gas guide pipe 26. The suction air s is guided to the combustor 32 through the compressed air guide duct 24. A bypass pipe 34 is connected to the compressed air guide duct 24 and the combustion gas guide pipe 26; on a part way of the bypass pipe 34, a bypass valve 36 is installed. The bypass valve 36 controls the flow rate of the suction air guided to the combustor 32. The gas turbine control unit 60 controls the opening of the bypass valve, in response to the power output of the gas turbine (or the load on the generator) or the other process variables.

Figure 2:
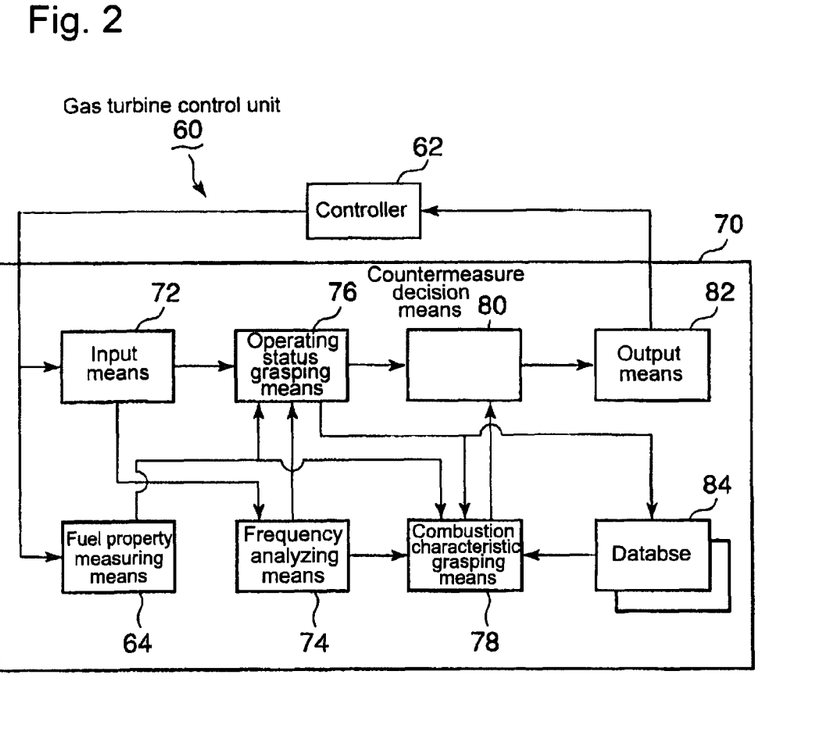
FIG. 2 shows a block diagram regarding a gas turbine control unit according to the first embodiment.

The fuel f is supplied to the combustor 32 from a fuel supply main-pipe 38 through three branch pipes 40, 42 and 44. On the fuel supply main-pipe 38, a calorimeter 46 for detecting the calorific value of the fuel f is provided;

the calorimeter 46 configures a fuel property measuring means 64 that forms a part of the controller (of a gas turbine control unit 60) in FIG. 2;

the calorimeter 46 is a gas analyzer for measuring the contents of the fuel f, thereby the volume ratios [in percent] as to a plurality of fuel components are measured and the calorific value of the fuel is calculated based on the measured volume ratios.

At the branch pipe 40, namely, a main fuel supply pipe 40, a main fuel flow rate control valve 48 is installed, and between the control valve 48 and the combustor 32, a main fuel supply valve 50 is installed. At the branch pipe 42, namely, a top-hat fuel supply pipe 42, a top-hat fuel flow rate control valve 52 is installed, and between the control valve 52 and the combustor 32, a top-hat fuel supply valve 54 is installed. At the branch pipe 44, namely, a pilot fuel supply pipe 44, a pilot fuel flow rate control valve 56 is installed, and between the control valve 56 and the combustor 32, a pilot fuel supply valve 58 is installed. The fuel through each fuel supply pipe 40, 42 or 44 is sent to the combustor 32 via a fuel nozzle (not shown) corresponding to each fuel supply pipe or each fuel supply valve 50, 54 or 58, respectively.

The compressor 12 compresses the suction air s into the compressed air of a high temperature and a high pressure. The compressed air is firstly mixed with the top-hat fuel, and then the air-fuel mixture streams into an inner side of an inner tube of the combustor. Inside of the inner tube, the air-fuel mixture (of the air and the top-hat fuel) is mixed with the main fuel so as to produce a revolution flow of the premixed air-fuel mixture, and the revolution flow streams into the tail pipe. On the other hand, the air-fuel mixture (of the air and the top-hat fuel) is mixed with the pilot fuel and burns so as to produce a part of combustion gas gushing into the tail pipe. Thereby, the part of the combustion gas gushing into the tail pipe accompanies the flame propagation in the tail pipe so that the combustion gas diffuses; thus, the revolution flow of the premixed air-fuel mixture is ignited; in this way, the stable combustion is achieved.

As described above, the main fuel for the premix combustion and the pilot fuel for the diffusion combustion are independently supplied to the combustor 32; thus, the reduction of NOx during higher load operation as well as the stability of combustion during lower load operation is aimed at. Further, the top-hat fuel for the premix combustion is supplied to the combustor 32 through a fuel line (a fuel nozzle) different from the main fuel line and the pilot fuel line; thus, further NOx reduction is aimed at. Incidentally, the fuel supply approach as describe above is a well-known approach (cf. Patent Reference JP2008-25910, for instance).

FIG. 2 shows the configuration of the gas turbine control unit 60. The gas turbine control unit 60 in FIG. 2 corresponds to the gas turbine control unit 104 in FIG. 4, the controller 62 in FIG. 2 corresponds to the controller 114 in FIG. 2, and an automatic tuning section 70 in FIG. 2 corresponds to an automatic tuning section 120 in FIG. 4. In addition, in the automatic tuning section 70, the fuel property measuring means 64, an input means 72, a frequency analyzing means 74, an operation status grasping means 76, a combustion characteristic grasping means 78, a countermeasure decision means 80 and an output means 82 have the same function as a fuel property measuring means 116, an input means 122, a frequency analyzing means 124, an operation status grasping means 126, a combustion characteristic grasping means 128, a countermeasure decision means 130 and an output means 132, respectively. However, the database of the combustion characteristic grasping means 78 is provided outside the grasping means 78, while the database of the combustion characteristic grasping means 128 is arranged in the grasping means 128.

Figure 3:
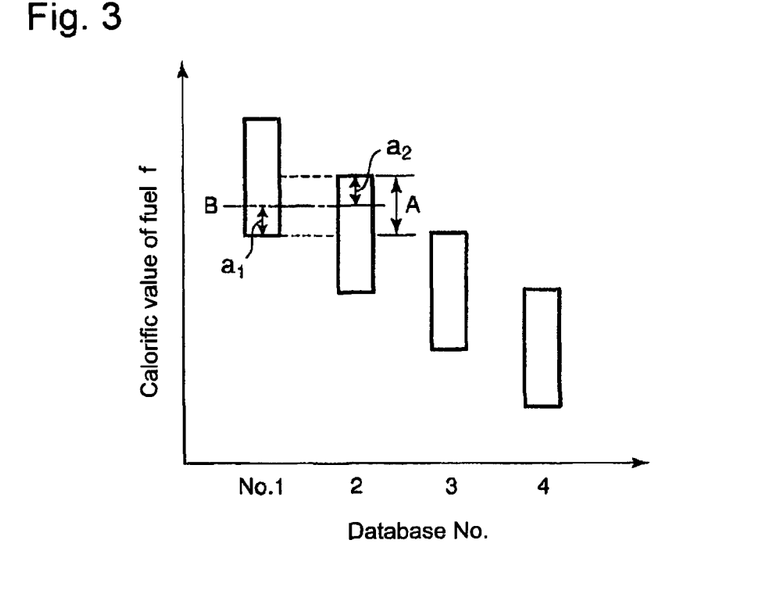
FIG. 3 shows a configuration mechanism of the database according to the first embodiment.

As shown in FIG. 3, in a database 84 comprising a plurality of sub-divided databases (i.e. the whole database comprises a plurality of databases), the data regarding each process variable including the information as to the maximum value of the vibration strength as well as the information as to the components or the calorific value of the fuel are stored in the sub-divided databases, in response to the calorific value of the fuel f that is measured by a fuel property measuring means 64. Therefore, the data regarding each process variable are transmitted from the operation status grasping means 76 (explained later) in a form of logged data. Further, as shown in FIG. 3, each sub-divided database includes the data of an interval of fuel calorific value; thereby, the interval of a sub-divided database and the interval of adjacent sub-divided database have an overlapped area.

In the present embodiment, with the configuration of the database as described above, the control processes disclosed in the patent reference 2 are performed; namely, on the basis of the measuring results in relation to the combustion vibrations, the fuel calorific value and the other process variables, the combustion control of the gas turbine 1 is performed by adjusting the flow rates of the fuel and the air supplied to the combustors 32.

Into the operation status grasping means 76, data regarding the process variables from the input means 72, fuel calorific value information measured and obtained by the fuel property measuring means 64, and maximum values regarding the vibration strength in relation to combustion vibrations obtained in the frequency analyzing means 74 are inputted. On the basis of the data inputted into the operation status grasping means 76, the status as to the combustion vibrations at each combustor 32 is evaluated. In a case where it is judged that an abnormal condition is occurring in a combustor, in a frequency bandwidth, as well as in a case where some plant operation variables such as the plant demand load or the suction air fluctuates vary, the data regarding each process variable including the information regarding the maximum value of the vibration strength as well as the information regarding the components or the calorific value of the fuel are accumulated as logged data.

The accumulated data as described above are transmitted into the database 84; on the basis of the transmitted data that are stored in the database (s) 84, the combustion characteristic grasping means 78 formulates the mathematical model for modeling the combustion characteristics. In other words, in the combustion characteristic grasping means 78, the maximum value regarding the strength of the pressure vibrations in each frequency bandwidth is expressed with respect to the process variables such as the components or the calorific value of the fuel, or the air flow rate, the process variables being treated as independent variables; for instance, by use of linear multiple regression approach, the maximum values are expressed (modeled) in a set of linear functions of the independent variables. In addition, in a case of the modeling by the linear multiple regression approach, the coefficients regarding the independent variables in the linear expressions are determined, for example, by use of the method of least squares.

In addition, it is hereby noted that the mathematical model used as numerical calculation approximations may be of a quadratic form, a high degree form (higher than 2), or a nonlinear expression as is used in the field of the neural network, in addition to the linear expression that is simple in applying the method of leas squares.

According to the mathematical model, the countermeasure decision means 80 identifies at least one process variable that tends to cause combustion vibrations in each frequency bandwidth; the countermeasure decision means 80 establishes the relation between each process variable (chiefly the flow rate of fuel or the air supplied to the combustors 32) and the degree (level) of combustion vibrations; by use of the established relations (e.g. equations) regarding multiple process variables, a feasible domain regarding the multiple process variables where combustion vibrations are prone (or less prone) to occur is demarcated, for example, by the aid of the approach as is used in the field of linear programming. Further, on the basis of the information as to the demarcated domain where combustion vibrations are prone (or less prone) to occur, the correction values are established in the countermeasure decision means 80; hereby, the correction values are related to each process variable (e.g. the fuel flow rate or the airflow rate) and the corresponding actuating variable for manipulating and controlling the gas turbine 1. The data regarding the established correction values are inputted into the controller 60 from the output means 82.

As described above, the gas turbine operation conditions under which the combustion vibrations are difficult to occur are determined; operating the gas turbine according to the operating conditions prevents the combustion vibrations from occurring.

With reference to FIG. 3, the method by which the data stored in the databases Nos. 1 to 4 are retrieved is now explained. Database No. 1 and database No. 2 have a common interval overlapped within a range A; the common intervals in the database No. 1 and in the database No. 2 include the same data regarding the components or the calorific value of the fuel. The common intervals are divided by a threshold value B which is the center position of the common interval (i.e. the range A) into a higher range $a_2$ and a lower range $a_1$ therein.

In a case where the data to be processed are retrieved from the database No. 1, the data in the lower range $a_1$ of the database No. 1 are retrieved; in a case where the data to be processed are retrieved from the database No. 2, the data in the lower range $a_2$ of the database No. 2 are retrieved.

According to the present embodiment, the data regarding the process variables of the gas turbine 1 are stored in each of the plurality of databases, the data being stored in response to data regarding the detected components or the detected calorific value of the fuel; namely, each database treating the data in which the component or the calorific value of the fuel is included so as to be within the predetermined interval; each database includes the data in which a concentrated lump of points regarding the components or the calorific value of the fuel exists. The data processing is performed per each database. Thus, the accuracy of the approximation treatments that are performed per the data stored in each database is enhanced by decreasing the non-linearity in modeling the relationship between the combustion vibrations and the components or the calorific value of the fuel.

Further, as the common intervals in the database No. 1 and the database No. 2 (i.e. the range A in FIG. 3) include the same data regarding the components or the calorific value of the fuel, the common intervals (i.e. the range A) are divided into the higher range $a_2$ and the lower range $a_1$ by the threshold value B.

In addition, in a case where the data to be processed are retrieved from the database No. 1, the data in the lower range $a_1$ of the database No. 1 are retrieved; in a case where the data to be processed are retrieved from the database No. 2, the data in the lower range $a_2$ of the database No. 2 are retrieved.

Thus, the discontinuity in mathematically approximating the combustion vibration characteristics by use of the data that are stored in the range A can be reduced.

Therefore, the combustion vibration characteristics in a case where the data in the range A are used in the data processing can be correctly grasped; as a result, the combustion vibrations can be prevented from occurring, before the vibration phenomenon is actually recognized.

Incidentally, according to the present embodiment, in the fuel property measuring means 64, the calorimeter 46 is used for measuring the fuel calorific value instead of the calorimeter for measuring the fuel calorific value, a gas analyzer measuring the fuel contents of the fuel gas may be provided so that the volume ratios regarding a plurality of fuel gas components in the fuel are measured; from the obtained volume ratios, the fuel content analysis is performed or the calorific value of the fuel gas is calculated. Thus, the results as to the fuel content analysis or the fuel calorific value may be outputted as the measuring result.

INDUSTRIAL APPLICABILITY

According to the present invention, in the combustion control of the gas turbine plant, the combustion vibration characteristics can be accurately grasped only by re-arranging the configuration regarding the database in the conventional gas turbine plant control device: thus, the combustion vibrations of the gas turbine is effectively prevented.

The invention claimed is:

1. A gas turbine control method for controlling a gas turbine plant and a gas turbine thereof, the method comprising:
    a first step of detecting process variables which affect combustion vibrations by a vibration measuring unit that measures the combustion vibrations occurring in each combustor of the gas turbine as pressure fluctuations or accelerations, a fuel property measuring unit that measures components or calorific value of fuel supplied to the combustor, and a process variables measuring unit that measures the process variables regarding fuel and air supplied to the combustors;
    a second step of analyzing a vibration level for each vibration frequency bandwidth on a basis of a plurality of the process variables measured by the process variables measuring unit, information regarding the components or the caloric value of the fuel measured by the fuel property measuring unit, and the pressure fluctuations or the accelerations obtained by the vibration measuring unit, so as to establish mathematical models by mathematically modeling combustion vibration characteristics based on the analyzed data;
    a third step of using a countermeasure decision unit for determining the adjustments for the operation of the gas turbine and outputting the adjustments to a controller wherein the controller increases or decreases the flow rate of the fuel or the air supplied to the combustor so as to maintain an operation condition under which the combustion vibrations are unlikely to occur based on the mathematical models;
    a fourth step of dividing and storing each of said process variables of the gas turbine obtained in the first step into a plurality of databases in response to the detected values of the components or the calorific value of the fuel, wherein said process variables are divided and stored into the plurality of databases such that adjacent databases have a common interval which is an area where a boundary region of each of the adjacent databases having data regarding the components or the calorific value overlaps;
    a fifth step of setting a threshold value in a part of the common intervals; and
    a sixth step of retrieving the detected values of the components or the calorific value of the fuel from each of the databases with the detected values of the process variables obtained in the first step to perform approximation treatments of the combustion vibration characteristics, wherein, regarding the data in the common interval of the adjacent databases, data is retrieved from the common interval of the database of which the detected values of the components or the calorific value of the fuel are continuous, and the approximation treatments are performed on the retrieved data, so as to decrease discontinuity in mathematically modeling the combustion vibration characteristics in a process of the approximation treatments.

2. A gas turbine control system for controlling a gas turbine plant and a gas turbine thereof, the system comprising:

a process variables detecting unit having a vibration measuring unit that measures combustion vibrations occurring in each combustor of the gas turbine as pressure fluctuations or accelerations, a fuel property measuring unit that measures components or calorific value of fuel supplied to the combustor, and a process variables measuring unit that measures the process variables regarding fuel and air supplied to the combustors, the process variables detecting unit being configured to detect a plurality of process variables including process variables regarding fuel and air supplied to the combustor, which affect the combustion vibrations;

a combustion characteristic grasping unit that establishes mathematical models by mathematically-modeling information regarding the components or the calorific value of the fuel, flow rate of the air, and the process variables as independent variables, on a basis of a vibration level analyzed for each vibration frequency bandwidth based on the plurality of the process variables detected by the process variables detecting unit, the information regarding the components or the calorific value of the fuel measured by the fuel property measuring unit, and the pressure fluctuations or the accelerations obtained by the vibration measuring unit;

a countermeasure decision unit that increases and decreases flow rate of fuel or air supplied to the combustor so as to maintain an operation condition under which the combustion vibrations are unlikely to occur based on the mathematically-modeled combustion vibration characteristics; and a plurality of databases into which said process variables of the gas turbine is divided and stored in response to the detected values of the components or the calorific value of the fuel;

wherein said process variables are divided and stored into the plurality of databases such that adjacent databases have a common interval which is an area a boundary region of each of the adjacent databases having data regarding the components or the calorific value overlaps; and a threshold value in a part of the common interval is set; and said combustion characteristic grasping unit retrieves the detected values of the components or the calorific value of the fuel from the plurality of databases with the detected values of the other process variables, and performs approximation treatments of the combustion vibration characteristics based on the retrieved values;

wherein, regarding the data in the common interval of the adjacent databases, said combustion characteristic grasping means retrieves data from the common interval of either one of the adjacent databases of which are detected values of the components or the calorific value of the fuel are continuous, and performs the approximation treatments on the retrieved data.

* * * * *